(12) United States Patent
Neef et al.

(10) Patent No.: US 11,247,159 B2
(45) Date of Patent: Feb. 15, 2022

(54) ROUND FILTER ELEMENT, IN PARTICULAR FOR GAS FILTRATION

(71) Applicant: MANN+HUMMEL GmbH, Ludwigsburg (DE)

(72) Inventors: Pascal Neef, Leonberg (DE); Nadine Donauer, Fellbach (DE); Philipp Hettkamp, Freiberg (DE); Arthur Sudermann, Steinheim (DE); Torsten Fritzsching, Vaihingen (DE); Mario Rieger, Ludwigsburg (DE); Michael Heim, Charlotte, NC (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 428 days.

(21) Appl. No.: 15/784,661

(22) Filed: Oct. 16, 2017

(65) Prior Publication Data

US 2019/0134546 A1 May 9, 2019

(30) Foreign Application Priority Data

Oct. 17, 2016 (DE) ................... 10 2016 012 328.1

(51) Int. Cl.
*B01D 46/00* (2006.01)
*F02M 35/024* (2006.01)
(Continued)

(52) U.S. Cl.
CPC ..... *B01D 46/0005* (2013.01); *B01D 46/0043* (2013.01); *B01D 46/0045* (2013.01); *B01D 46/0049* (2013.01); *B01D 46/106* (2013.01); *B01D 46/2411* (2013.01); *B01D 46/521* (2013.01); *B01D 46/523* (2013.01); *F02M 35/0203* (2013.01); *F02M 35/0245* (2013.01); *F02M 35/02416* (2013.01);
(Continued)

(58) Field of Classification Search
None
See application file for complete search history.

(56) References Cited

U.S. PATENT DOCUMENTS 6,568,540 B1 * 5/2003 Holzmann ........... B01D 29/016
210/445
7,041,146 B2 * 5/2006 Bugli ................. B01D 46/0023
123/198 E
(Continued)

FOREIGN PATENT DOCUMENTS

DE 102014006850 A1 12/2014
DE 102017207508 A1 * 11/2018 ......... F02M 35/0215
EP 3315185 A1 * 5/2018 ......... F02M 35/0223

*Primary Examiner* — Patrick Orme
*Assistant Examiner* — Brit E. Anbacht (57) ABSTRACT

A filter device is disclosed having a round filter element having a filter medium body with an open interior. The filter element is installable into a filter housing having a base filter housing and a housing cover, in which an inflow opening of the cover overlaps against and aligns with an inflow opening of a base housing part such they form a continuous inflow opening. A support mesh cage arranged on the radially outer wall of the annular filter medium body. The filter housing has a longitudinally extended cross-sectional shape in which the inflow opening and an outlet opening are both arranged on the base housing part at opposing sides of the base housing part.

12 Claims, 7 Drawing Sheets

(51) Int. Cl.
  *B01D 46/52* (2006.01)
  *F02M 35/02* (2006.01)
  *B01D 46/10* (2006.01)
  *B01D 46/24* (2006.01)

(52) U.S. Cl.
  CPC ............... *F02M 35/02433* (2013.01); *F02M 35/02483* (2013.01); *B01D 2265/06* (2013.01); *B01D 2275/208* (2013.01); *B01D 2277/20* (2013.01); *B01D 2279/60* (2013.01)

(56) References Cited

U.S. PATENT DOCUMENTS

| | | | | |
|---|---|---|---|---|
| 7,708,797 | B2* | 5/2010 | Kuempel | B01D 46/527 55/521 |
| 7,905,936 | B2* | 3/2011 | Coulonvaux | B01D 46/0005 55/357 |
| 7,972,404 | B2* | 7/2011 | Kuempel | B01D 46/525 55/521 |
| 8,163,057 | B2* | 4/2012 | Blossey | F02M 35/024 55/503 |
| 8,262,759 | B2* | 9/2012 | Amesoeder | B01D 46/106 55/309 |
| 8,298,308 | B2* | 10/2012 | Li | F02M 35/0203 55/385.3 |
| 8,496,723 | B2* | 7/2013 | Reichter | B01D 46/0005 55/503 |
| 9,404,451 | B2* | 8/2016 | Bernardo | F02M 35/10295 |
| 9,587,598 | B2* | 3/2017 | Kaufmann | B01D 46/0002 |
| 10,315,147 | B2* | 6/2019 | Carter | B01D 46/0015 |
| 10,337,472 | B2* | 7/2019 | Kaufmann | F02M 35/02491 |
| 2006/0081528 | A1* | 4/2006 | Oelpke | B01D 46/527 210/493.1 |
| 2008/0307759 | A1* | 12/2008 | Reichter | B01D 46/0005 55/428 |
| 2011/0247582 | A1* | 10/2011 | Blossey | B01D 46/0024 123/198 E |
| 2013/0327005 | A1* | 12/2013 | Menssen | B01D 46/2411 55/493 |
| 2014/0260141 | A1* | 9/2014 | Croissant | B01D 46/0005 55/498 |
| 2015/0176544 | A1* | 6/2015 | Kaufmann | B01D 46/0023 55/425 |
| 2015/0343359 | A1* | 12/2015 | Neef | B01D 46/008 55/495 |
| 2016/0101380 | A1* | 4/2016 | Pereira Madeira | F02M 35/02483 55/503 |
| 2016/0129385 | A1* | 5/2016 | Schulz | B01D 46/2411 55/482 |
| 2016/0131094 | A1* | 5/2016 | Pereira Madeira | B01D 46/0005 96/414 |
| 2016/0144310 | A1* | 5/2016 | Movia | B01D 46/2411 55/478 |
| 2016/0177891 | A1* | 6/2016 | Yadav | B01D 46/0024 96/10 |
| 2017/0173512 | A1* | 6/2017 | Van Den Bossche | B01D 46/2414 |

* cited by examiner

ROUND FILTER ELEMENT, IN PARTICULAR FOR GAS FILTRATION

TECHNICAL FIELD

The invention relates to a round filter element, in particular for gas filtration.

BACKGROUND

DE 10 2011 011 595 A1 describes a filter element for air filtration, the filter medium body of which is embodied annularly circumferentially and encloses an interior flow chamber into which the unfiltered fluid is introduced axially. The filter medium body, through which the fluid flows radially from interior to exterior, has a longitudinally extended sectional shape with semi-circular narrow sides and longitudinal sides oriented concavely inward. The filter medium body has a constant cross-sectional shape that above its axial height remains the same.

Known from DE 10 2013 002 057 B4 is a filter device and a filter element that has an oval cross-sectional shape. The filter device has a receiving housing with an inlet connector and an outlet connector, wherein the inlet connector is on a housing cover and the outlet adapter is on a base housing body. A bag-shaped secondary element is received in the oval filter element and is supported on an interior frame segment of the filter element.

Further known from DE 10 2014 006 850 A1 is a very similar filter device that also has an oval filter element having a corresponding housing and, in addition, also having guide means, in particular braces, in a contact zone between base housing and housing cover.

SUMMARY

The underlying object of the invention is to embody, using simple design measures, a filter device having a round filter element that has an interior flow chamber and through which a fluid to be filtered flows from interior to exterior such that high filtration performance is attained over a long operating period.

The inventive filter device includes a round filter element, in particular for gas filtration, and is preferably an air filter for the intake air of an internal combustion engine. The filter device furthermore preferably comprises a filter housing for receiving the round filter element. The round filter element has a filter medium body through which the fluid to be filtered may flow radially, relative to the filter longitudinal axis of the filter element or filter device, and which surrounds an interior flow chamber. The round filter element and/or the filter housing preferably have a longitudinally extended cross-sectional shape. An inlet opening is preferably provided in the filter housing for introducing an unfiltered fluid and, further preferred, an outlet opening is provided in the filter housing for removing a filtered fluid on opposing sides of the filter housing. At least one opening, i.e., inlet opening and/or outlet opening is furthermore preferably arranged in the region of a narrow side of the filter housing. Inlet opening and outlet opening are furthermore preferably arranged on opposing narrow sides and are also preferably arranged on opposing axial ends of the filter housing with respect to the longitudinal axis of the filter housing or filter element. At least one opening, i.e., inlet opening and/or outlet opening, is furthermore preferably arranged such that it forms a 45° angle with a longitudinal center plane of the filter housing that intersects the narrow sides of the filter housing. In this way, it is possible to optimize the flow, especially when using the round filter element.

The inventive filter device having a round filter element is preferably used for gas filtration, for instance for filtering air, especially in the intake tract of an internal combustion engine of a motor vehicle. The filter element has an annularly closed filter medium body, and the unfiltered fluid flows radially through the wall thereof. The filter medium body encloses an interior flow chamber that is delimited by the inner wall of the filter medium body, wherein the inner wall forms the unfiltered side. The fluid to be filtered is introduced into the interior flow chamber axially and flows radially through the wall of the filter medium relative to its longitudinal axis. The exterior of the filter medium body forms the filtered side, via which the filtered fluid exits from the wall of the filter medium body. The axial end faces of the filter medium body are covered flow-tight by end disks. One end disk has a central opening, which communicates with the interior flow chamber, for guiding the fluid flow axially; in contrast, the opposing end disk is embodied closed and seals off the interior flow chamber to the outside axially.

The filter housing of the filter device has a longitudinally extended, oval, or ovalized cross-section. The longitudinally extended cross-section includes, for instance, a cross-sectional shape having parallel longitudinal sides and semi-circular narrow sides. The round filter element to be received in the filter housing also has a corresponding cross-sectional shape.

According to the invention, the filter housing comprises a base filter housing and a housing cover that can be placed onto the base filter housing and with which a receiving space in the base filter housing, in which the filter element may be placed, is closed. Both the base filter housing and the housing cover have a longitudinally extended cross-section.

An inlet opening for introducing the unfiltered fluid and an outlet opening for conducting the filtered fluid out are added to the filter housing. The inlet opening and the outlet opening are disposed on radially opposing sides of the filter housing, wherein the flow longitudinal axes of inlet opening and outlet opening, which axes characterize the flow path through each opening, are oriented at least approximately radially and, with a longitudinal center plane of the filter housing, form a maximum 45° angle, for example, an angle between 20° and 45°. The longitudinal center plane of the filter housing is the plane that intersects the two opposing narrow sides of the filter housing and simultaneously includes the longitudinal axis of the filter housing and the inserted filter element. The longitudinal center plane preferably divides the filter housing into two mirror-symmetrical halves relative to the basic geometry of the filter housing.

This embodiment has the advantage that the flow of the fluid that is filtered in the filter device experiences only relatively few deflections and consequently the flow speed through the filter geometry is only reduced by a relatively small measure. This improves the filtration performance of the filter device.

According to another useful embodiment, both the inlet opening and the outlet opening are disposed in the base filter housing that receives the filter element. Inlet opening and outlet opening are disposed on opposing sides of the base filter housing, however. Advantageously added to the housing cover is an inlet opening that, when assembled, is in alignment with the inlet opening in the base filter housing when the housing cover has been placed onto the base filter housing.

The opening longitudinal axes of the inlet opening and of the outlet opening in the base filter housing may have at least approximately parallel opening longitudinal axes, wherein it is also possible for there to be an angle, for instance 30°, between the opening longitudinal axes of the inlet opening and of the outlet opening, wherein angular deviations greater than or smaller than 30° are also possible. As described in the foregoing, however, the angular deviation of the opening longitudinal axes of both the inlet opening and the outlet opening relative to the longitudinal plane of the filter housing is a maximum of 45°, wherein smaller angular deviations, such as for instance a maximum of 30°, are also possible. Moreover, it is also possible for the flow longitudinal axes of both the inlet opening and the outlet opening to be disposed in or at least approximately in the longitudinal center plane of the filter housing. In an alternative embodiment, the opening longitudinal axes of inlet opening and outlet opening are at least approximately in a common plane, but this plane is at a maximum 30° angle or a maximum 45° angle to the longitudinal center plane.

According to another useful embodiment, the opening longitudinal axis of the inlet opening and/or of the outlet opening is disposed at least approximately in a plane that is orthogonal to the filter longitudinal axis. For instance, the inlet opening is disposed laterally in the wall of the base filter housing so that the opening longitudinal axis of the inlet opening is orthogonal to the filter longitudinal axis and thus is in the plane that is oriented orthogonally to the filter longitudinal axis. With this orientation of the inlet opening, it may be useful for the outlet opening to be inclined, at an angle that is advantageously at least 30°, to the plane that is orthogonal to the filter longitudinal axis. The outlet opening is in particular arranged in a region close to the bottom of the base filter housing, for instance in the transition region between a side wall and the bottom of the base filter housing.

Alternatively, an embodiment may be used in which either both the inlet opening and the outlet opening are oriented such that each of their opening longitudinal axes is at least approximately in the plane orthogonal to the filter longitudinal axis, or an embodiment may be used that has an angled inlet opening and an outlet opening, the opening longitudinal axis of which is at least approximately in the plane orthogonal to the filter longitudinal axis.

Both the inlet opening and the outlet opening may be disposed on housing connectors that are molded onto the base filter housing. The housing connectors project especially radially—relative to the filter longitudinal axis—beyond the base filter housing.

According to another advantageous embodiment, arranged on the interior of the housing cover is a preferably blade-shaped flow guide rib that supports the introduction of the fluid flow into the interior flow chamber and promotes uniform particle load on the filter element during filtration of the fluid, especially even in non-symmetrical or non-parallel flows. The unfiltered liquid is preferably conducted from the outside radially towards the filter medium body and then strikes, on the interior of the housing cover, the flow guide rib, which influences the fluid flow striking it, for instance conducts the fluid flow divided in two and/or axially towards the interior flow chamber in the filter medium body.

Various embodiments of the flow guide rib may be used. The flow guide rib is either embodied straight and in one plane, or, according to an alternative embodiment, is embodied curved. In the straight embodiment, the flow guide rib may extend in the axial direction of the filter element such that the wall sides of the flow guide rib run parallel to the longitudinal axis of the filter element.

The flow guide rib may project into the flow opening that is added to the end disk of the round filter element and via which the unfiltered fluid is introduced into the interior flow chamber in the filter medium body.

According to another useful embodiment, when installed, the filter element projects slightly axially beyond the end face of the base filter housing so that removing the filter element from the base filter housing, for instance for maintenance purposes, is facilitated. The seal support with the sealing element is disposed a small axial distance from the projecting end face of the filter element and assures flow-tight separation between the exteriorly disposed segment of the filter element and the interiorly disposed segment of the filter element received in the base filter housing.

It is useful that the end disk that is on the filter element and is provided with the central opening is embodied rounded on its radial interior, so that the it is easier for the unfiltered air to flow into the interior of the filter medium body. The radius of the rounding is advantageously greater on the radial interior of the end disk than on the radial exterior. The radius on the radial interior may be embodied large enough that the beginning of the radius on the end face is still disposed within the contour of the filter medium body.

The inner wall and the outer wall of the filter medium body preferably run concentric with one another so that the filter medium body has a constant radial thickness.

According to another useful embodiment, the round filter element has an axially tapering cross-sectional shape, so that the outer circumference of the round filter element, in the region of the first end disk, is different in size compared to the outer circumference of the round filter element in the region of the opposing, second end disk. In this embodiment, as well, both end disks may have round cross-sectional shapes, so that the round filter element and the filter medium body are embodied in cone shapes. Moreover, it is also possible to provide an oval or ovalized cross-sectional shape in the region of each of the end disks.

When the round filter element has a tapering cross-sectional shape, the end disk on the end face having the smaller outer circumference may be embodied closed and may close off the interiorly disposed flow chamber axially, whereas the opposing end disk on the greater outer circumference has a flow opening for introducing fluid into the interior flow chamber.

Moreover, embodiments are possible in which the end disk on the end face having the greater outer circumference is embodied closed and axially closes off the interiorly disposed flow chamber, and the opposing end disk on the smaller outer circumference has a flow opening for introducing fluid into the interior flow chamber.

On the exterior wall of the filter medium body, the round filter element has a support mesh that is in particular embodied in a dimensionally stable manner. The support mesh is embodied as a thermoplastic injection molded part, for instance. Because the flow passes through the filter medium body radially from interior outward, the wall of the filter medium body is subject to a pressure directed radially outward, causing the wall to tend to bulge outward. The support mesh on the outer wall of the filter medium body prevents the wall from deforming radially outward and thus during the filtration helps the filter medium body maintain its shape so that deformation is prevented. Consequently, the filter medium body retains its original geometric shape over a long operating period and the flow behaviors are preserved the during filtration of the fluid. In addition, the exterior of the filter medium body is supported by the support mesh, so that the filter medium body is subjected to lower loads and the risk of damage to the filter medium body is reduced. Advantageously, at least one end face, and possibly both end faces, of the support mesh is/are embedded in the end disks. The end disk preferably comprises a softer material than the support mesh and a seal support on the filter element that receives a sealing element.

The filter medium body is preferably embodied as a pleated filter having a plurality of filter pleats. The filter pleats preferably run radially or approximately radially and thus run in the direction of flow and at the same time extend axially between the two end faces of the filter medium body. The pleated filter is embodied annularly closed.

In particular exactly one filter medium body embodied as a round filter is arranged in the filter element.

According to another advantageous embodiment, a molded body projects into an end face of the filter medium body and provides additional stabilization for the filter medium body and, in the embodiment as a pleated filter, holds the filter pleats in the desired position. In the embodiment having a tapering cross-sectional surface area, the molded body is preferably disposed on the end face having reduced cross-sectional surface area. The molded body may be embodied integrally with the support mesh on the filter medium body, so that support forces that act on the end face of the filter element with the molded body are conducted via the molded body onto the support mesh and the end disk is relieved by the support forces.

The outer contour of the molded body advantageously corresponds to the outer contour and/or inner contour of the filter medium body on its end face into which the molded body projects into the filter medium body. It may be useful to connect the molded body, at least in segments, to the adjacent end disk, for instance to embody on the molded body a dome that projects into the end disk. The end disk into which the one or a plurality of segments of the molded body project is preferably embodied closed and seals off the interior in filter medium body in a flow-tight manner. The molded body may possibly taper in a wedge shape towards its free end face, which simplifies and facilitates the filter element manufacturing process. The molded body is especially embodied as a longitudinally extended body and extends between opposing sides of the support mesh.

According to one advantageous embodiment, the round filter element has a sealing element, in particular a circumferential sealing ring, that is arranged on a seal support embodied separately from the end disk and adjacent to the unfiltered air-side end disk via which the unfiltered fluid is introduced into the interior flow chamber. The sealing element is disposed axially and radially spaced apart from the closest adjacent end disk. The unfiltered side is separated flow-tight from the filtered side using the sealing element. Because the seal support is embodied separately from the end disk, the end disk is not subjected to the holding and sealing forces that are absorbed via the sealing element and the seal support when the round filter element is installed. The end disk thus remains unaffected by the holding and sealing forces. Due to the axial and radial distance from the sealing element, and advantageously also the seal support, to the adjacent end disk, seal support and sealing element are also spaced apart from the filtered or exterior of the filter medium body so that the fluid can exit unimpeded from the seal support and from the sealing element via the filtered side of the filter medium body. The seal support is embodied fluid-tight and advantageously connects the closest adjacent end disk to the sealing element in a fluid-tight manner.

The seal support is axially spaced apart from the end face of the closest adjacent end disk. The axial spacing relative to the entire axial height of the filter element is, for example, a maximum of 30% of the axial height, preferably a maximum of 20% of the axial height or a maximum of 10% of the axial height.

According to a preferred embodiment, the seal support is arranged on the support mesh. Support mesh and seal support may especially be embodied integrally, preferably as plastic components. The sealing, holding, and support forces are correspondingly absorbed via the seal support and the support mesh, whereas the filter medium body is relieved of these forces.

According to another advantageous embodiment, the seal support is embodied as a circumferential support wall that runs spaced apart from the outwardly disposed jacket surface of the filter medium body. The support wall especially runs parallel to the outwardly disposed jacket surface of the filter medium body. The sealing element is advantageously placed into a receiving groove in the support wall, wherein the receiving groove is preferably disposed on or adjacent to an end face of the support wall. The position of the sealing element on the support wall is disposed at the end face of the support wall facing away from the closest end disk.

When installed, the seal support is advantageously supported on a housing component, for instance an interior shoulder in a base filter housing that accommodates the filter element and onto which a housing cover may be placed.

It is possible for nubs to be molded onto the end face, especially onto the top of the seal support, and advantageously spaced apart axially from the end face. These nubs compensate tolerances and may compensate deviations on the part of the seal support from a planar surface for placing the housing cover and/or placing onto the shoulder in the base filter housing. The nubs are embodied, for example, in bar shapes and are disposed parallel to the side wall of the seal support; the rod-shaped nubs run radially, for example. When installed, the nubs press into the material of the housing component and/or the nubs are in particular elastic or plastic and deformed, hereby compensating deviations in tolerance. A softer material than for the housing component (especially the housing cover) is preferably selected for the nubs, so that the deformation occurs essentially or completely in the nubs.

According to another useful embodiment, the smaller end disk has radially overhanging supporting cams. These supporting cams advantageously project radially no further than the opposing end disk or the inner or outer contour of the opposing seal. However, a slight overlap may be provided in order to attain particularly strong tensioning. The inner contour of seal support and/or sealing element advantageously runs radially essentially along the outer circumferences of the larger end disk.

If the cross-sectional shape of the filter medium body is an oval or ovalized, the supporting cams are preferably arranged on the longitudinal sides and in particular on the end disk, preferably on the smaller end disk, and in particular are embodied integrally with the end disk and molded thereto. It is also possible, however, to additionally arrange one or a plurality of cams on the end disk. The cams project radially beyond the end disk and when installed support the round filter element on the receiving filter housing.

BRIEF DESCRIPTION OF THE DRAWINGS

Additional advantages and useful embodiments may be found in the other claims, the description of the figures, and the drawings. The figures are as follows.

In the drawings, like components are assigned like reference signs.

DETAILED DESCRIPTION

FIGS. 1, 2, 6 and 7 illustrate a filter device 1 that is preferably used for gas filtration, especially for air filtration in the intake tract of an internal combustion engine. The filter device 1 comprises a filter housing 2 that includes a base filter housing 3 and a housing cover 4, and includes a filter element 5 that may be inserted into the base filter housing 3. The housing cover 4 closes the receiving space in the base filter housing that is for receiving the filter element 5.

Figure 1:
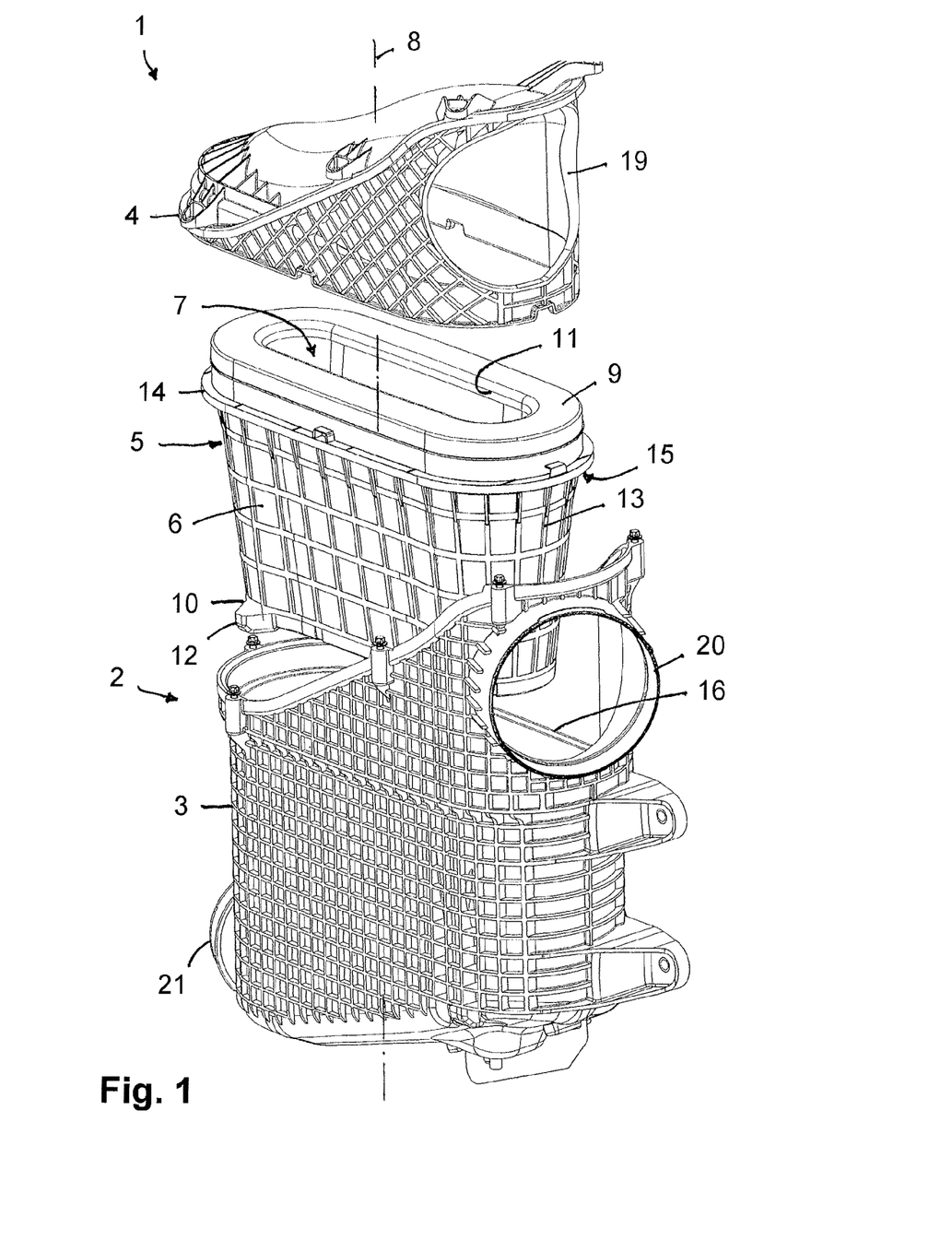
FIG. 1 is an exploded depiction of a filter device for gas filtration, having a base filter housing, a filter element, and a housing cover.
Figure 3:
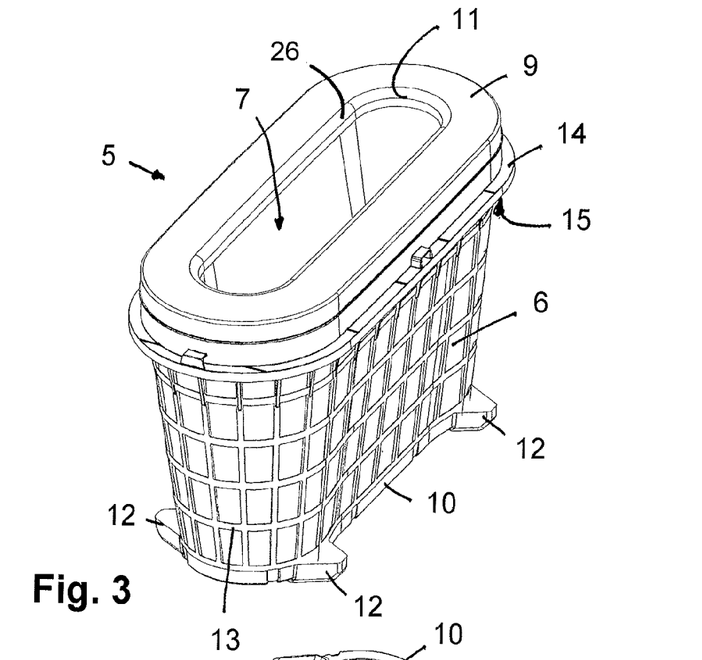
FIG. 3 is perspective elevation of the filter element from above.
Figure 4:
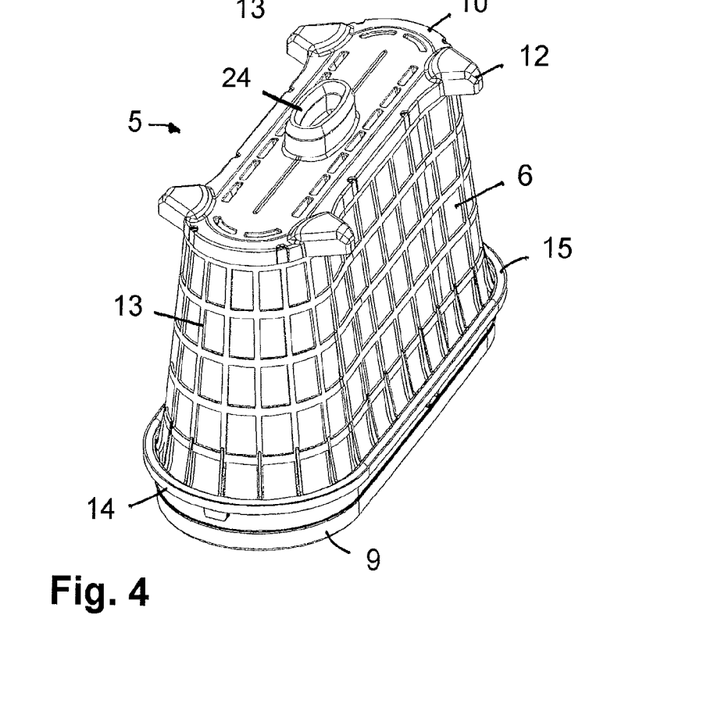
FIG. 4 is perspective elevation of the filter element from below.

As may be seen in FIGS. 1, 3, and 4, the filter element 5 is equipped with a filter medium body 6 where the filtration of the unfiltered fluid occurs. The filter element 5 is embodied as a round filter element, the filter medium body 6 is correspondingly embodied as a round element that encloses an interior flow chamber 7 into which the unfiltered fluid is introduced. The fluid is introduced into the flow chamber 7 axially relative to the filter longitudinal axis 8 of the filter element 5 and the filter device 1 (FIG. 1). Then the fluid flows radially through the wall of the filter medium body 6, from inside outward. Consequently, the inner wall of the filter medium body 6 forms the unfiltered side and the outer wall forms the filtered side.

The filter element 5 and the filter medium body 6 have a highly ovalized shape with two parallel longitudinal sides and two semi-circular narrow sides. The filter element 5 also has a conical basic shape in which the axially opposing end faces of the filter element 5 are embodied with different sizes and have different sized outer circumferences. The axial end faces of the filter medium body 6 are each covered, flow-tight, by an end disk 9, 10, wherein the end disk 9 on the larger end face of the filter element 5 is embodied open and has a flow opening 11 via which the unfiltered fluid can flow into the interior flow chamber 7. In contrast, as may be seen in FIG. 4, the opposing end disk 10 is embodied closed, so that the interior flow chamber 7 is also closed on this side.

Molded onto the end disk 10 that is embodied closed are cams 12 that extend radially outward and are positioned on the longitudinal sides adjacent to the narrow sides. The cams 12, which are embodied integrally with the end disk 10, support the filter element 5 on the base filter housing 3 when assembled. The cams 12 project no further forward radially than the opposing, larger end disk 9.

A support mesh 13 that is especially made of plastic and is embodied separately from the end disks 9 and 10 is disposed on the outer wall of the filter medium body 6. The support mesh 13 supports the filter medium body radially on its outer wall. Because the flow passes through the filter medium body 6 radially from the interior outward, an outward pressure occurs in the filter medium body and is absorbed by the support mesh 13. This ensures that the filter medium body 6 is not deformed by the pressure of the fluid flowing through it.

A seal support 14 that supports a sealing element 15 is disposed adjacent to the end disk 9 to which the flow opening 11 for introducing the unfiltered fluid is added. The seal support 14 is embodied as a circumferential support wall that lies in a plane orthogonal to the longitudinal axis 8 and is preferably embodied integrally with the support mesh 13. The seal support 14 is arranged spaced slightly axially apart from the end disk 9 disposed thereabove and at a significantly greater axial distance from the end disk 10 therebelow. The outer circumference of the seal support 14 has a greater radial extension than the outer wall of the filter medium body 6.

The sealing element 15 is embodied as a sealing ring that is preferably inserted into a receiving groove in the end face of the support wall 14 on the side facing away from the adjacent end disk 9. The sealing element 15 faces away from the closest end disk 9 and faces the opposing end disk 10, and, when assembled, is disposed on a circumferential shoulder 16 (FIG. 1) on the inner wall of the receiving base filter housing 3. The shoulder 16 is disposed spaced axially apart from the upper edge of the base filter housing 3.

Figure 5:
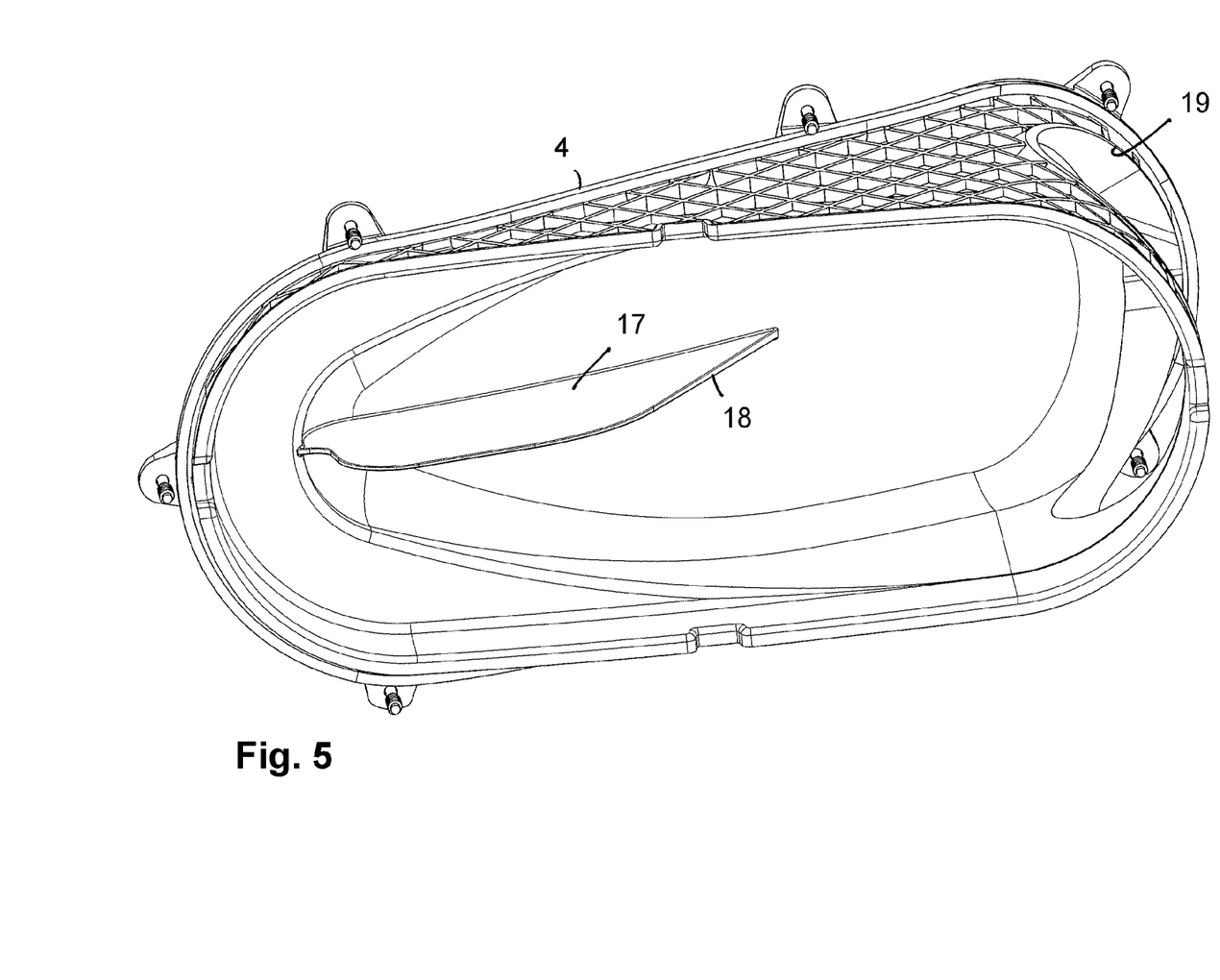
FIG. 5 is an inner view of the housing cover, having a flow guide rib on the inside of the housing cover.
Figure 6:
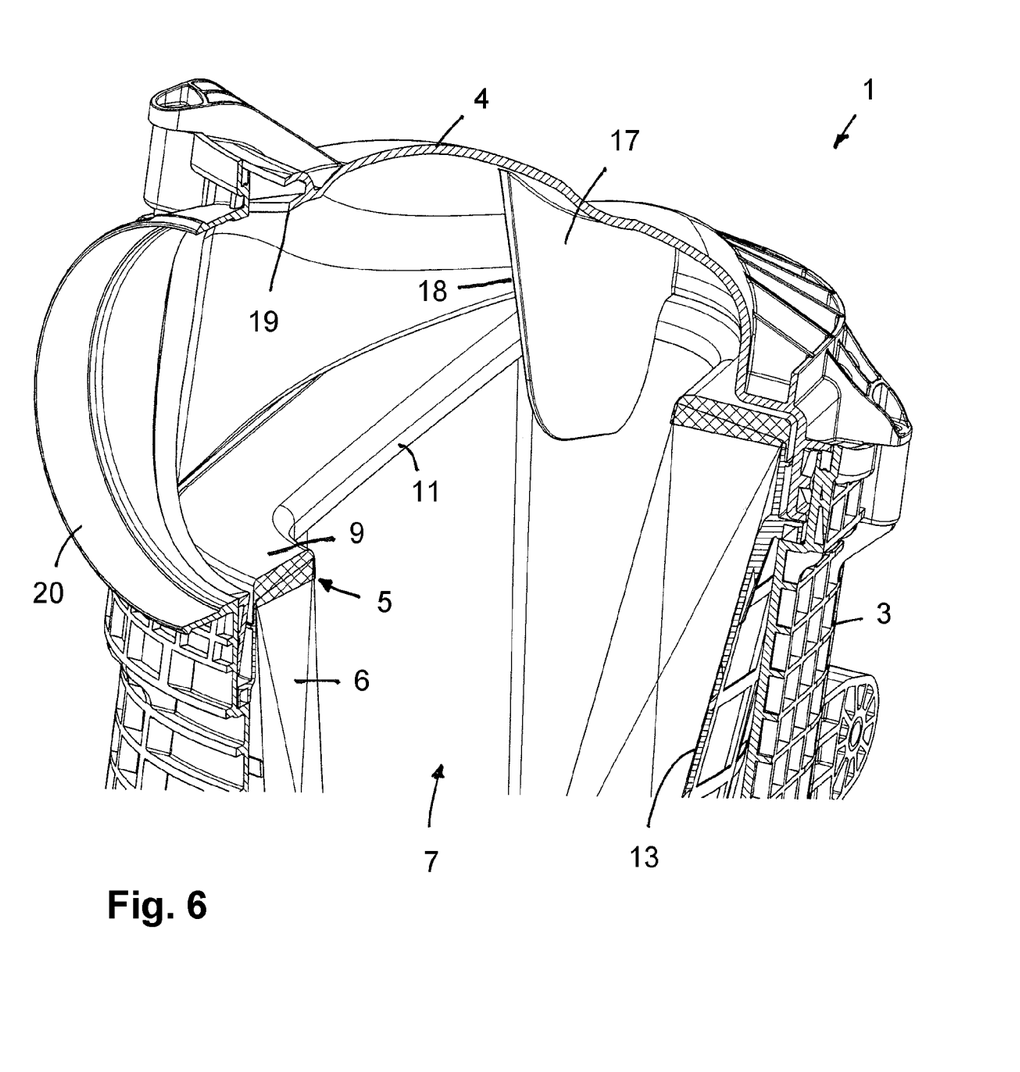
FIG. 6 is a perspective elevation of a section through the filter device in the region of the housing cover.
Figure 7:
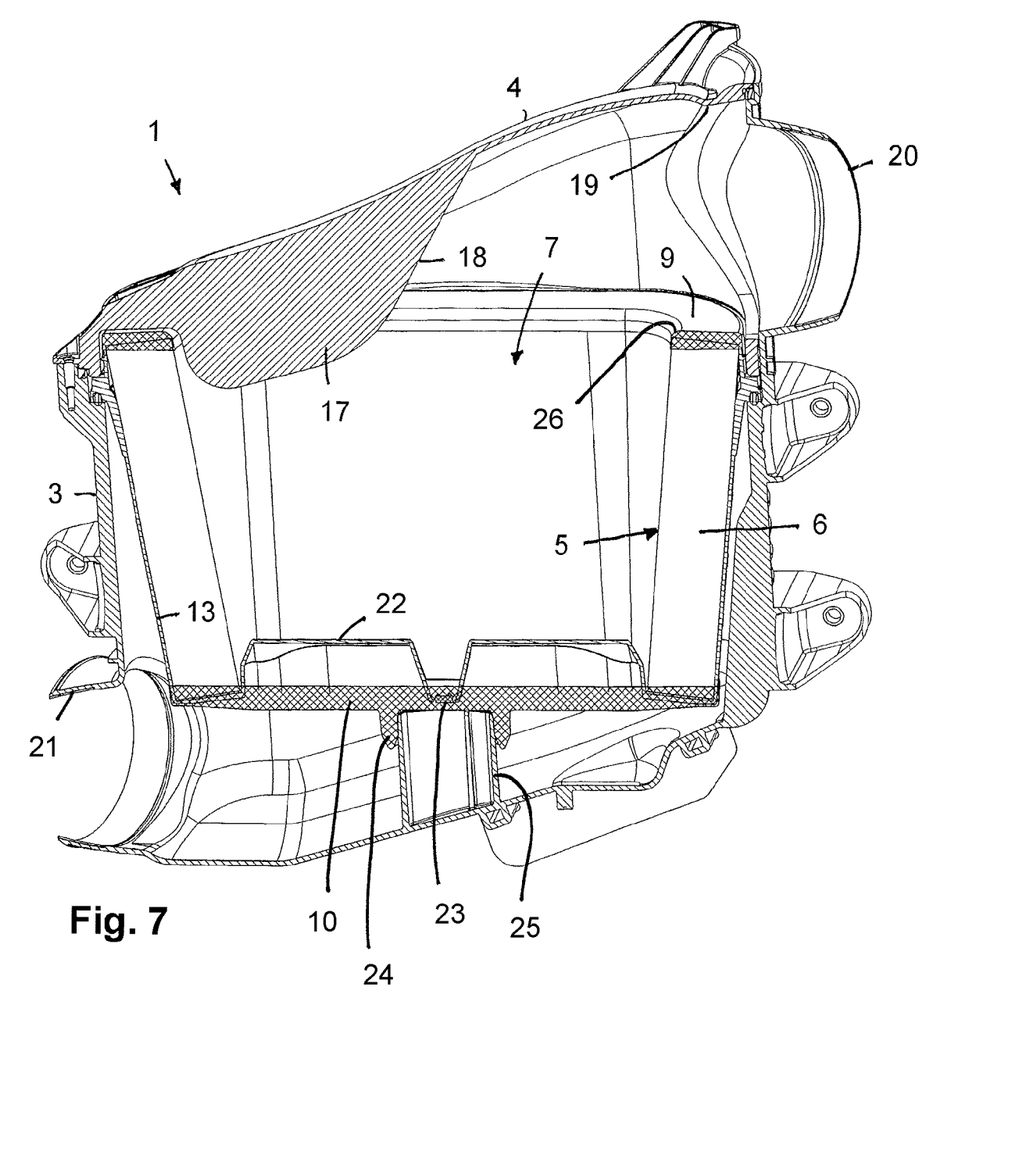
FIG. 7 depicts another section through the filter device.

The following relates to the housing cover 4, which on its interior has a blade-shaped flow guide rib 17 (FIGS. 5, 6, 7). The flow guide rib 17 is in particular embodied straight and lying in a plane and, when assembled, extends axially into the interior flow chamber 7 in the filter element 5, as may be seen in FIGS. 6 and 7. The flow guide rib 17 is embodied integrally with the housing cover 4.

A lateral inlet opening 19 through which the unfiltered fluid may flow radially into the filter device is added to the housing cover 4. The inlet opening 19 in the housing cover 4 corresponds to another inlet opening 20 that is added to the base filter housing 3. When the housing cover 4 is seated, the inlet openings 19 and 20 overlay one another so that a continuous flow path is formed for the unfiltered fluid. The end face 18 of the flow guide rib 17 faces the inlet opening 19 in the housing cover 4. The flow guide rib 17 is disposed especially centered on the interior of the housing cover 4 so that the radially approaching unfiltered fluid is divided by the blade-shaped flow guide rib 17 and, in addition, experiences improved further axial flow towards the interior flow chamber 7 in the filter medium body 6.

Figure 2:
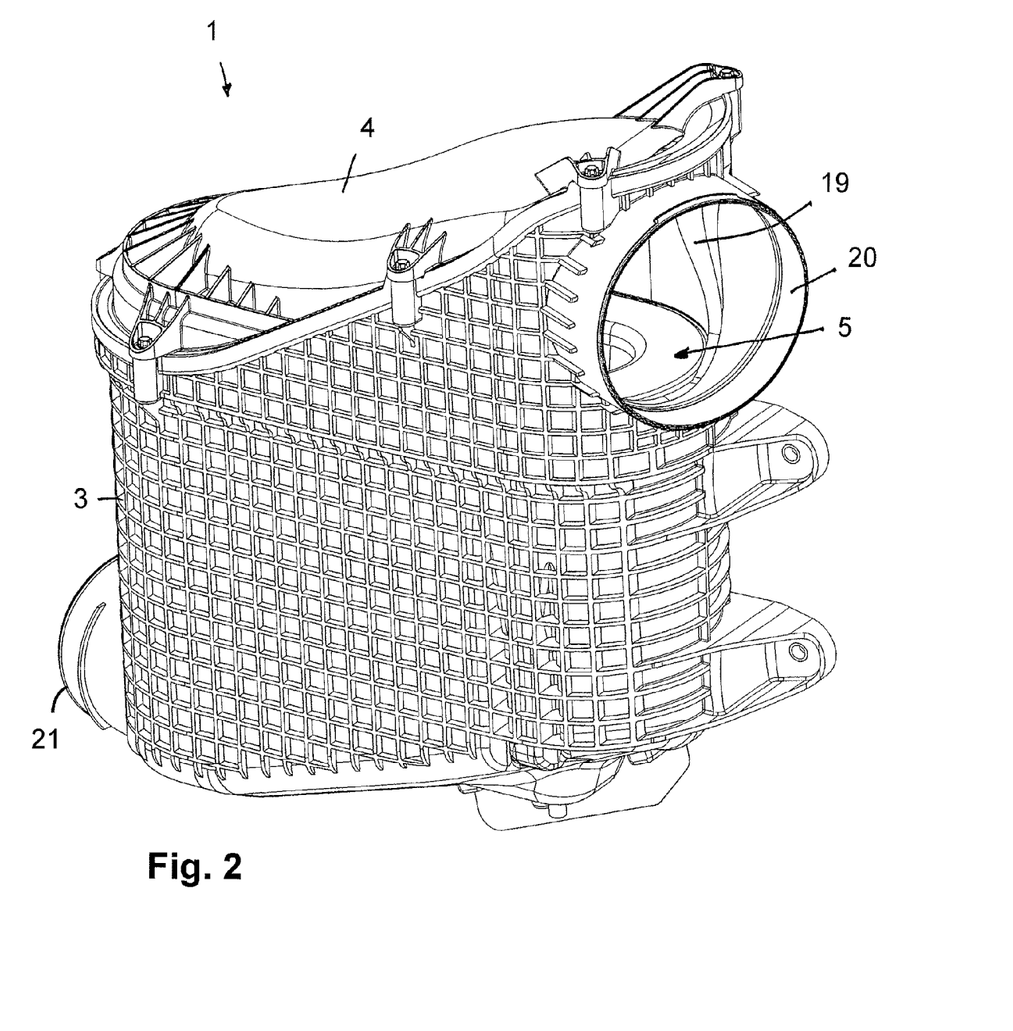
FIG. 2 is a perspective elevation of the filter device when assembled.

As may be seen in FIGS. 1, 2, and 7, a lateral, radial outlet opening 21 for removing the filtered fluid is disposed on the base filter housing 3. The flow longitudinal axes of the inlet openings 19 and 20, one the one hand, and of the outlet opening 21, on the other hand, run at least nearly parallel. The plane of the flow guide element 17 may likewise run at least approximately parallel to flow longitudinal axes of inlet openings and outlet opening, even though it is also possible to have embodiments having a non-parallel arrangement of both the flow guide element 17 to the openings 19, 20, and 21 and embodiments having a non-parallel arrangement between the inlet openings 19 and 20 and the outlet opening 21.

As may be seen from FIG. 7, a molded body 22 that is in particular embodied integrally with the support mesh 13 is disposed in the bottom region of the filter element 5, adjacent to the lower end disk 10. The molded body 22 projects axially into the interior flow chamber 7 in the filter medium body 6 and stabilizes the filter medium body 6 embodied as a pleated filter. The molded body 22 tapers in a wedge shape to its open end face and in the center region has a depressed dome 23 that projects into the lower end disk 10. The radially exterior segments of the molded body 22 also project into the end disk 10, so that a secure connection is obtained between the molded body 22 and the lower end disk 10. The molded body 22 is embodied at least essentially straight and extends in the longitudinal direction of the filter medium body 6. The radially exterior segments of the molded body 22 are connected to the support mesh 13, so that support and holding forces are absorbed by the molded body 22 and the lower end disk 10 is relieved.

As may be seen in FIG. 7 in connection with FIG. 4, an annular support part 24 is molded onto the lower end disk 10 on the side facing axially away from the interior flow chamber 7 and may be used to place the filter element 5 onto a housing-side supporting dome 25. The supporting dome 25 is disposed on the bottom of the base filter housing 3. The annular support part 24 has a longitudinally extended cross-sectional shape.

As may further be seen in FIG. 7, the inlet openings 19 and 20 are positioned such that the end face of the upper end disk 9 and the inlet openings 19 and 20 form a continuous contour at the same height. The lower interior of the inlet openings 19 and 20 is disposed at the same height axially as the outer end face of the end disk 9 situated thereabove. This ensures that the unfiltered fluid can flow in unimpeded.

As may be seen in FIG. 7 in conjunction with FIG. 3, at its radially interior side facing the central opening the upper end disk 9 is provided with a rounding 26 that facilitates the inflow of the unfiltered fluid into the interior flow chamber 7. The radius of the rounding 26 is advantageously greater on the radial interior of the end disk 9 than on the radial exterior of the end disk 9.

Figure 8:
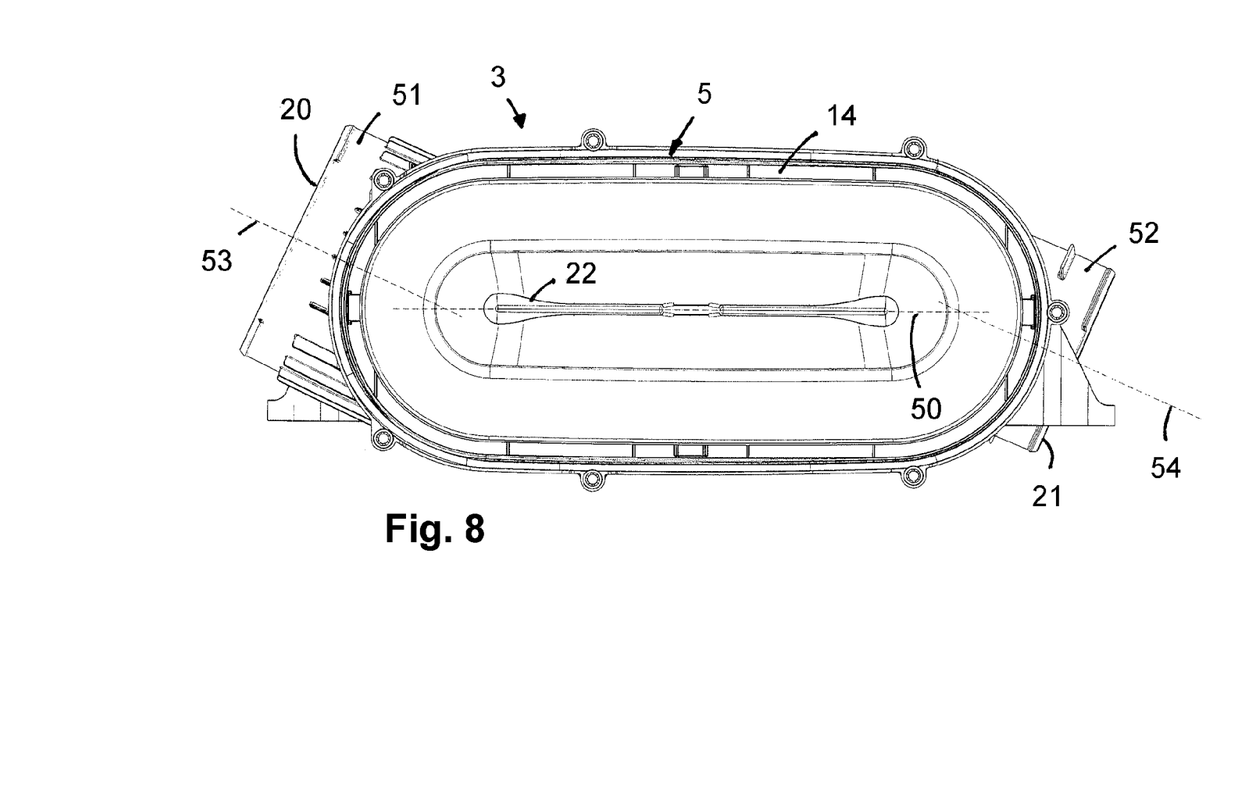
FIG. 8 is a top view of a base filter housing having an inserted filter element, wherein an inlet connector and an outlet connector are molded to the base filter housing.

FIG. 8 depicts a top view of a base filter housing 3 with inserted filter element 5, but without housing cover. Analogous to the filter element 5, the base filter housing 3 has a longitudinally extended cross-sectional shape with semi-circular narrow sides and straight longitudinal sides. The base filter housing 3 has a constant cross-sectional shape across its axial height. The basic geometry of the base filter housing 3 with the adjacent side walls and the bottom is embodied mirror-symmetrical to a longitudinal center plane 50 that extends through the center of the base filter housing 3 and intersects the semi-circular narrow sides in the center.

Housing connectors 51 and 52 are molded onto the narrow sides at diametrically opposite sides on the base filter housing 3. The housing connector 51 forms an inlet connector for introducing the unfiltered fluid, and the housing connector 52 forms the outlet connector, via which the filtered fluid is removed. Consequently, the inlet opening 20 is disposed at the open end face of the inlet connector and the outlet opening 21 is disposed at the open end face of the outlet connector 52. The connectors 51 and 52 are each embodied straight, the connector longitudinal axes 53 and 54 also form the opening longitudinal axis at the height of the inlet opening 20 and the outlet opening 21 that define the direction of the fluid flow. Both the opening longitudinal axis 53 of the inlet opening 20 and the opening longitudinal axis 54 of the outlet opening 21 are at an angle of less than 30° to the longitudinal center plane 50. The opening longitudinal axes 53 and 54 run parallel to one another.

Moreover, various orientations of both the inlet connector 51 and outlet connector 52 with respect to a plane orthogonal to the filter longitudinal axis may be used. In an advantageous embodiment, the opening longitudinal axes 53 and 54 of the connectors 51 and 52 extend parallel to the plane oriented orthogonally to the filter longitudinal axis. However, other angular deviations are also possible, either only for one connector 51, 52 or for both connectors 51, 52, in that for instance the outlet connector 52 is oriented downward, at a maximum angle of preferably 30°, relative to the plane orthogonal to the filter longitudinal axis, and thus faces away from the open side of the base filter housing 3.

What is claimed is:

1. A filter device having a round filter element for gas filtration, comprising:
   a round filter element having:
     an annular filter medium through which unfiltered gas may flow radially relative to a filter longitudinal axis of the filter element, the annular filter medium elongated along and surrounding the filter longitudinal axis, the annular filter medium having an interior flow chamber in an interior of the annular filter medium, the filter longitudinal axis extending through the interior flow chamber, the annular filter medium forming a filter medium body;
   the annular filter medium having:
     a radially outer wall forming a first flow face of the annular filter medium; and
     a radially inner wall in the interior of the annular filter medium and facing the interior flow chamber;
   a first end disk arranged at a first axial end of the annular filter medium, the first end disk closing off the interior flow chamber at the first axial end;
   a second end disk arranged on a second axial end of the annular filter medium, the second end disk having a flow opening which opens into the interior flow chamber of the annular filter medium; and
   a support mesh cage arranged on the radially outer wall of the annular filter medium and surrounding the annular filter medium, the support mesh cage having a plurality of openings for gas flow to pass through the support mesh cage to or from the annular filter medium;
   a filter housing having:
     a base filter housing having an interior space in which the round filter element is received;
     a housing cover fastened to the base filter housing and closing over the interior space;
   wherein the base filter housing includes:
     an inlet opening for introducing an unfiltered gas to be filtered; and
     an outlet opening for discharging filtered gas from the filter housing;
   wherein the outlet opening is arranged on an opposite side of the filter housing from the inlet opening;
   wherein the housing cover includes:
     a second inlet opening which opens radially through an outer wall of the housing cover, the second inlet opening positioned such that when the housing cover is assembled onto the base filter housing, the inlet opening of the base filter housing is aligned with and opens through the second inlet opening of the housing cover; and
     a flow guide blade formed integrally together with the outer wall of filter housing, the flow guide blade arranged at and extending radially across an axially outer face of the second end disk, extending there-from radially inwardly on the housing cover to project axially inwardly through the flow opening of the second end disk;

wherein both the inlet opening and the outlet opening form a maximum angle of 45 degrees relative to a longitudinal center plane of the filter housing that intersects narrow sides of the filter housing, the filter longitudinal axis lying on the longitudinal center plane;

wherein the inlet opening and the outlet opening are arranged on the base filter housing.

2. The filter device according to claim 1, wherein the housing cover includes a second inlet opening, such that when the housing cover is assembled onto the base filter housing, the inlet opening of the base filter housing is aligned with and added to the second inlet opening of the housing cover.

3. The filter device according to claim 1, wherein the inlet opening and the outlet opening have at least approximately parallel opening longitudinal axes.

4. The filter device according to claim 1, wherein the opening longitudinal axes of the inlet opening and outlet opening are at an angle of at least 30 degrees to one another.

5. The filter device according to claim 4, wherein the opening longitudinal axes of the inlet opening and the outlet opening are at least approximately in a common plane.

6. The filter device according to claim 5, wherein the opening longitudinal axis of the inlet opening and the outlet opening lie at least approximately in a plane orthogonal to the filter longitudinal axis.

7. The filter device according to claim 6, wherein the opening longitudinal axis of the outlet opening is inclined at an angle of at least 30° to the plane that is orthogonal to the filter longitudinal axis.

8. The filter device according to claim 1, wherein an interior surface of the housing cover forms the flow guide blade which projects axially from the housing cover into the flow opening of the second end disk of the round filter element.

9. The filter device according to claim 8, wherein the flow guide blade is elongated on the housing cover in a radial direction relative to the filter longitudinal axis to extend in a radial direction towards the inlet opening of the base filter housing, so as to divide and guide the unfiltered gas flowing into the interior flow chamber.

10. The filter device according to claim 1, wherein a circumferential shoulder configured to support the round filter element is arranged on an interior surface of the of the base filter housing.

11. The filter device according to claim 1, wherein the round filter element further comprises:
  a molded body arranged on the first axial end of the annular filter medium and extending across the interior flow chamber, the molded body at the interior flow chamber having:
    a first portion spaced axially inwardly away from the first end disk and projecting into the interior flow chamber; and
    a depressed dome formed on the first portion in the interior flow chamber, the depressed dome projecting axially outwardly from the first portion to contact against the first end disk.

12. The filter device according to claim 1, wherein the depressed dome is embedded into the first end disk.

* * * * *